United States Patent Office 2,779,417
Patented Jan. 29, 1957

2,779,417

PLUGGING WELL CASING PERFORATIONS

Roscoe C. Clark, Jr., Midland, Tex., and George C. Howard, Tulsa, Okla., assignors to Stanolind Oil and Gas Company, Tulsa, Okla., a corporation of Delaware No Drawing. Application February 15, 1954,
Serial No. 410,416

6 Claims. (Cl. 166—31)

This invention pertains to the plugging of perforations in a well, and more particularly it pertains to cementing off casing perforations in a well. This is a continuation-in-part of our application Serial Number 72,056 filed January 21, 1949, now abandoned.

The casing in a well, particularly in an oil or gas well, may become either accidentally perforated due to corrosion, erosion, excessive stress and the like or the casing may be deliberately perforated for the purpose of draining adjacent producing strata into the well or in some cases for repairing casing cementing jobs. Perforations are sealed generally to prevent flow of undesired fluids into wells, to seal off depleted producing zones, to repair rips or tears in the casing, and, as indicated, to repair a cement sheath behind the casing and for other reasons well known in the art. This invention is directed to the sealing or plugging of such perforations with an improved plugging agent irrespective of the cause of the perforation or reason for sealing it.

We have found that the methods used in cementing casing perforations prior to our invention are generally unsatisfactory for a number of reasons. According to the customary method of cementing such perforations, a well is first killed by injecting a weighted mud into the well. Portland or other oil well cement is then injected into the casing and spotted in the region of the perforations. Pressure is then applied to the cement to displace it into the perforations. We have found that in cementing perforations with this type of cement, due to its tendency to be readily dehydrated physically, the cement tends to enter only the perforation or perforations which offer the least resistance to the displacement of the mud therein. This cement then proceeds to replace all the mud in the particular perforation, and due to its tendency to be dehydrated when placed against a permeable boundary under pressure, i. e., due to its high-water-loss characteristics, the water in the cement tends to be displaced into the permeable formation, the cement particles being then dehydrated and packed in the perforation. Water from the cement slurry adjacent the particular perforation tends to flow through the compacted cement particles in the perforation and produce a compact cake of solid particles adjacent the casing perforation within the casing. And, within limits, the longer the cement slurry is subjected to pressure, the more cement will be dehydrated and compacted against the perforation until the casing is completely plugged with cement. Thus, assuming the mud in the top perforation offers the least resistance to displacement and has therefore been plugged with cement, the cement slurry will never reach the other casing perforations. Accordingly, when the plug of dehydrated cement particles sets in the casing and is subsequently drilled out, the lower perforations will continue to admit extraneous fluids into the well.

Various additives have been incorporated in a hydraulic cement to prevent this physical dehydration when pressure is applied to a water-cement slurry and the slurry is placed under pressure in contact with a permeable boundary. Such additives are, in a few instances, effective in preventing the loss of fluid from a hydraulic cement slurry. However, cements containing such additives are not per se suitable for cementing perforations in a well casing. More particularly, when these so-called low-water-loss cements are pumped into a casing perforation under pressure to displace the mud therefrom, such cements behave like the mud they displace, i. e., having a retarded tendency to dehydrate, they will be displaced by the pressure into the formation. As is now known, once the formation commences to take a low-water-loss fluid, i. e., once the formation is fractured, the pressure required to extend that fracture into the formation is substantially less than the pressure required to initiate the fracture. It will, therefore, be apparent that in cementing casing perforations with these low-water-loss cements, only one or, perhaps, two of the perforations will be plugged and that perforation will be the one in which the fluid therein is most readily displaced into a fracture in the adjacent formation. In such cases we have found that in order to produce a satisfactory plug in all of a multiplicity of perforations, the cement, after being injected into a perforation, must first be allowed to set and then it must be drilled out and a similar cement job performed for each of the multiplicity of casing perforations.

It is, therefore, an object of this invention to provide an improved method for plugging well casing perforations. It is a further object of this invention to provide an improved cement for plugging well casing perforations. A more specific object of this invention is to provide a cement composition which will not dehydrate substantially under pressure when in contact with a permeable formation and which will have a substantially retarded tendency to enter fractures in the formations outside the casing. More specifically, it is an object of this invention to provide an improved method of cementing casing perforations by incorporating in a low-water-loss cement a sealing or bridging agent capable of preventing the low-water-loss cement from entering the fractured formations behind the pipe whereby all of the multiplicity of casing perforations are plugged in a single cementing operation. These and other objects of this invention will become apparent as the description proceeds.

According to this invention, well casing perforations are plugged by first killing the well to facilitate placement of the special cement composition and to prevent fluid movement therein during the time the cement sets in the perforation. While it is thus generally desirable to kill the well, this invention is not so limited inasmuch as in some cases as, for example, in plugging off perforations near the bottom of a low-fluid-level well, the fluid movement in the well and in the perforations is so small as not to interfere with the setting of the cement in the perforation. After killing the well, in the preferred embodiment the perforated section of the casing is preferably isolated from the remainder of the well as, for example, by setting cement retainers above or, in some cases, both above and below the perforations in the casing.

The low-water-loss cement slurry containing the bridging material is then pumped into the isolated section of the casing, for example, through the tubing or drill pipe, substantial pressure being applied to displace the mud from the casing and perforations back into the formation. The pressure generally required to displace this mud is in the range of between about 0.6 to about 1.0 pound per square inch per foot of elevation difference between the elevation of the isolated section and the surface elevation. This pressure, hereinafter referred to as the "formation-breakdown pressure," is, more specifically, the bottom hole pressure at which the rocks appear to fracture and permit the mud to be injected into the well over a wide volume range with no material change in the pressure required to displace the mud into the well. Generally, however, after all the mud has been displaced from the casing and the perforations, we prefer to apply to the cement slurry a squeeze pressure equal to the formation-breakdown pressure plus a substantial pressure—for example, a pressure of 1.5 times the formation-breakdown pressure, the casing strength permitting—to insure that the mud in each and all perforations has been displaced by the cement slurry back into the formations. We have found also that even with cement squeeze pressures substantially in excess of the formation-breakdown pressures, our improved cement composition will not enter the formations. With our improved composition, we have found that such pressures are generally readily obtained when all perforations have been filled and additional cement is injected into the well. While a low-water-loss cement slurry has a retarded tendency to dehydrate when placed under pressure against a permeable formation, this cement slurry does in due time become physically dehydrated in the perforations and when so physically dehydrated under pressure, the plug cannot be readily removed even if the well pressure is reduced to substantially atmospheric pressure. This high pressure is, therefore, preferably retained for a substantial length of time—for example, for from about 10 to about 30 minutes. In any case, after any excess cement in the drill pipe or tubing is circulated out of the well, the well is shut in preferably at the maximum pressure and allowed to stand idle while this dehydrated cement in the casing perforations and the excess slurry in the casing hydrates or sets. The pressure on the casing is then released and after a time, for example, from about 1 to about 3 days, when the surplus cement within the casing has set, the surplus cement and cement retainers are drilled out and the well may again be placed on production, reperforated, or the like.

In this specification and in the appended claims the term low-water-loss cement shall mean and refer to any hydraulic cement which when mixed with water to form a pumpable slurry will have a water-loss or filtrate rate less than 100 cc. in 30 minutes, employing the filtration apparatus and process described in American Petroleum Institute, Code 29, second edition, July, 1942, "Standard field procedure for testing drilling fluids," (tentative), section V. Such cement, including a prehydrated starch additive, is described in detail in U. S. Patent 2,662,827.

These low-water-loss cements are produced by incorporating in the cement which may be either Type I, Type II, ("Standard specifications for Portland cement," ASTM designations: C 150-44, adopted, 1941; revised 1942, 1944, 1950) or the like a cement water-loss reducing additive such as: carboxymethyl cellulose (CMC) or salts thereof, e. g., ethylene diamine CMC or triethanol amine CMC; soy bean protein; methyl cellulose; starch ethers or salts thereof; polyvinyl alcohol; acid alkyl sulfoethyl cellulose ether; 2-hydroxy- 3 butenyl cellulose ether; alkyl hydroxyalkyl cellulose mixed ethers; a water-soluble resin, typically water-soluble alkali salts of partially hydrolyzed polyacrylamide or polyacrylic acid; inulin; alkali lignin sulfonate and an alkali metal salt of an inorganic acid; water-soluble alkali metal polyvinyl sulfate; and the like and may include other additives such as defoaming agents, set retarders, set accelerators, etc.

A bridging material, sometimes herein referred to as a sealing agent, refers to those materials generally which are used in the drilling fluid art to maintain or recover circulation of the drilling fluid. These materials or agents may be fibrous, lamellar, flaky, or granular and have a maximum dimension preferably greater than about 0.1 inch. They are substantially inert in a hydraulic cement, i. e., they do not materially affect the set of such cement. A granular bridging material is preferred. It is made up of rigid angular particles preferably having a wide gradation of particle sizes which tend to bridge against each other in a crevice without being distorted appreciably. Ground nutshells, ground fruit pits, ground plastic, etc., are examples of granular bridging materials. This material typically has a gradation of particle sizes between about 4 and about 100 mesh U. S. sieve including particles of intermediate sizes, desirably having particle sizes throughout the complete range. Fibrous bridging materials are pliable, stringy, and tend to entangle or mat over a crevice. Such materials which have been found to be particularly beneficial in plugging casing perforations when incorporated in a low-water-loss cement slurry include, by way of example, hair and other animal fibers, cotton linters, asbestos fibers, bagasse fibers, bamboo fibers, corn stalk fibers, straw, prairie hay, glass wool, and other mineral, wood, animal, and vegetable fibers. Lamellar and flaky materials which include those materials formed in thin sheets or flakes have also been found to be particularly beneficial in our process. Such materials include mica, celluloid, cellophane, wheat bran, cotton seed hulls, rice hulls, fish scales, guttapercha flakes, rubber pulp, shredded paper, sawdust, wood shavings, iron oxide such as mill scale, metal foil, and the like.

While we do not intend to be limited to our theory of operation, it appears that when the bridging materials such as described above are incorporated in a low-water-loss cement slurry and forced through a perforation, they tend to plaster the walls of the perforations and prevent the low-water-loss cement from entering the formations even at pressures substantially above the formation-breakdown pressure and thus from fracturing such formations. Accordingly, when the mud in the perforation has been displaced as, for example, back into the pores or into a fracture or crevice in the formation or some other crevice behind the casing, and when the low-water-loss cement containing the bridging agent contacts the fracture or crevice, the bridging agent appears to bridge the fracture or crevice and stop the flow of cement. It will thus be apparent that extremely small particles such as bentonite or other colloids or particles in the size range of cement particles, particles in the range of about 200 mesh and smaller, which would not prevent the low-water-loss cement from entering the fracture would be of no value as a bridging material. The bridging material must instead have a maximum dimension great enough to bridge a fracture produced by fluids containing such particles. While a maximum dimension of 0.1 inch is satisfactory in a number of cases, notably in the case of granular bridging materials, we prefer that the bridging material have a maximum dimension in the range between about ½ inch and 1½ inches—for example, about ¾ inch. This length is generally readily pumpable and large enough to bridge all fractures produced behind the cement sheath in plugging cement perforations. It will be apparent that the maximum dimension is not limited on the top side except by the pump or the ability to displace the bridging material into the well. Due to the nature of present pump valves, this dimension is generally maintained below about 1½ inches. The thickness of fibrous or flaky particles of bridging material is also not critical. Generally any flaky or fibrous material that can be pumped through a perforation about ½ inch in diameter or thereabout is suitable.

The quantity of bridging material may constitute between about 0.5 and about 10 percent, preferably between about 1 and 2.5 percent, by weight, of the low-water-loss cement solids. The range is limited only by the strength of the cement and the amount of slurry required to obtain a seal. These proportions may thus vary over a substantial range depending upon the particular bridging material, the pump rate, etc.

A cement composition which has been found quite satisfactory for plugging casing perforations in wells consists of the following parts by weight: 1000 parts cement, 10 parts polyvinyl alcohol, 1 part tributyl phosphate, and 10 parts cellophane flakes having a maximum dimension of substantially ¾ inch. The solids are mixed together and sufficient water added to make a pumpable slurry, for example, from about 5 to about 8 gallons of water—preferably about 7.25 gallons are added per 100 pounds of solids. After the well is killed and the casing perforated, this slurry is displaced into the well, preferably through tubing or drill pipe at a reasonably low rate by ordinary cement pumps. As the mud in the casing and perforations is displaced into the formation or the space behind the casing, the pressure rises to the formation-breakdown pressure and then when all perforations have been filled, the pressure again rises sharply as previously described.

As an example of a field application of this invention, in the Hobbs, New Mexico, area a 5½ inch oil string was set at 6,893 feet in a 7⅞ inch hole. The oil string was cemented throughout the pay zone to about 6,100 feet using centralizers and scratchers. The casing was spudded for 1¼ hours before cementing and during placement of the cement. The bottom pay was not commercial so the casing was plugged back to below 6,575 feet and perforated with four jet shots per foot from 6,541 feet to 6,545 feet and from 6,550 feet to 6,574 feet. After the perforations were washed with acid, the well made 2 barrels of oil in four hours with a gas/oil ratio of 87,000 cu. ft./bbl. This gas/oil ratio being considered too high, the perforations were then plugged. To plug the perforations, a drillable cement retainer was set at 6,510 feet and the perforations broke down at a surface pressure of 2,200 pounds as 26 barrels of mud and 50 barrels of water were pumped through the perforations. Following the water, 100 sacks of low-water-loss cement slurry containing 1.25 percent by weight polyvinyl alcohol and polypropylene glycol as a foam depressing agent with no bridging material were squeezed through the perforations. This slurry had a filtrate rate of 39 cc. per 30 minutes by the standard API mud filtrate test. Fifty sacks of the same low-water-loss cement slurry containing 4 pounds of medium Tuf-Plug per sack of cement were then pumped into the well. Medium Tuf-Plug consists of 50 percent −10 +16 mesh and 50 percent −16 +100 mesh ground walnut shells with substantially uniform distribution of intermediate particle sizes in each range. Following that slurry, 25 sacks of the same low-water-loss cement containing 8 pounds of medium Tuf-Plug per sack of cement were pumped as a slurry into the well. After the pressure rose to 5,100 p. s. i., the stinger was pulled from the retainer leaving the pressure applied to the slurry in the perforations. Thirty-five of the 75 sacks of low-water-loss cement slurry containing the bridging material were then reversed out of the well. The remaining 40-sack slurry was left in the perforations and in the casing, mostly below the cement retainer. After waiting 36 hours for the cement to set, the retainer and 65 feet of hard cement were drilled out of the casing. A test of the squeezed interval at a surface pressure of 1,025 p. s. i. for 30 minutes with no pressure drop indicated a successful squeeze job.

It will thus be apparent that we have provided an improved cement and an improved and substantially more reliable method of plugging perforations in a well casing, particularly where there are a substantial number of such perforations and where it is desirable to plug all of them in one cementing operation. Manifestly, the method described and the cementing composition are both capable of substantial modification and such modification is considered to be within the spirit and intent of the invention.

We claim:

1. A method of plugging a multiplicity of spaced perforations in a well casing containing mud and traversing a permeable zone comprising the steps of introducing into said casing a slurry of hydraulic cement having by weight, based on the weight of cement in said slurry, about 1 percent of a cement water-loss reducing additive and between about 0.5 to 10 percent of a pumpable bridging material which has a maximum dimension of about 0.1–1.5 inches, applying pressure to said slurry thereby causing it to displace the mud from said casing into said perforations, and to flow into at least some of said perforations depositing a sheath of said bridging material on the exposed face of any crevices in said permeable zone and plugging same, successively flowing said slurry into additional perforations at progressively higher pressures until said mud has been displaced from all of said perforations and has been replaced with said slurry of cement, and allowing said cement to hydrate in said perforations.

2. A method according to claim 1 in which said cement water-loss reducing additive comprises polyvinyl alcohol.

3. A method according to claim 1 in which said cement water-loss reducing additive comprises prehydrated starch.

4. A method of plugging a multiplicity of spaced perforations in a well casing cemented in a permeable formation comprising the steps of introducing into said casing a slurry of hydraulic cement containing a quantity of a cement water-loss reducing additive to reduce the filtrate rate of said slurry to less than about 100 cc. per 30 minutes on the standard API mud filtrate rate tester, and between about 0.5 and 10 percent of a pumpable bridging material which has a maximum dimension of about 0.1–1.5 inches.

5. A cement composition for plugging casing perforations in a well comprising a slurry of hydraulic cement containing a quantity of a cement water-loss reducing additive to reduce the filtrate rate of said slurry to less than about 100 cc. per 30 minutes on the standard API mud filtrate rate tester, and between about 0.5 and 10 percent of a pumpable bridging material which has a maximum dimension of about 0.1–1.5 inches.

6. A composition according to claim 5 in which said water-loss reducing additive comprises polyvinyl alcohol and said bridging material comprises a gradation of particle sizes of ground nutshells.

References Cited in the file of this patent

UNITED STATES PATENTS

| | | |
|---|---|---|
| 1,716,925 | Loomis | June 11, 1929 |
| 2,353,372 | Stone | July 11, 1944 |
| 2,432,971 | Ruthman et al. | Dec. 16, 1947 |
| 2,489,793 | Ludwig | Nov. 29, 1949 |
| 2,549,507 | Morgan et al. | Apr. 17, 1951 |
| 2,576,955 | Ludwig | Dec. 4, 1951 |
| 2,646,360 | Lea | July 21, 1953 |
| 2,662,827 | Clark | Dec. 15, 1953 |